(12) United States Patent
Badgerow

(45) Date of Patent: Jul. 13, 2010
(10) Patent No.: US 7,752,733 B1

(54) LASER WELDED STEP MOTOR CONSTRUCTION WITH COMPACT END CAP AND STATOR LAMINATION POSITIONING

(75) Inventor: Richard Badgerow, Watsonville, CA (US)

(73) Assignee: Lin Engineering, Inc., Santa Clara, CA (US)

( * ) Notice: Subject to any disclaimer, the term of this patent is extended or adjusted under 35 U.S.C. 154(b) by 504 days.

(21) Appl. No.: 11/593,206

(22) Filed: Nov. 6, 2006

(51) Int. Cl.
H02K 15/00 (2006.01)
(52) U.S. Cl. .................. 29/596; 29/598; 310/49.43
(58) Field of Classification Search ........... 29/596–598, 29/732–735; 310/68 R, 64, 52, 112, 49 R, 310/49.43–49.45; 219/121.63–121.64, 121.83
See application file for complete search history.

(56) References Cited

U.S. PATENT DOCUMENTS

| | | | |
|---|---|---|---|
| 3,801,842 A * | 4/1974 | Touchman | ................ 310/49 R |
| 3,949,186 A | 4/1976 | Nakayama et al. | |
| 4,833,295 A | 5/1989 | Locker et al. | |
| 5,053,663 A | 10/1991 | Boer et al. | |
| 5,093,596 A * | 3/1992 | Hammer | ..................... 310/191 |
| 5,315,751 A * | 5/1994 | Hammer | ...................... 29/598 |
| 5,627,418 A * | 5/1997 | Satomi et al. | ................. 310/12 |
| 5,902,498 A | 5/1999 | Mistry et al. | |
| 5,965,041 A | 10/1999 | Rich et al. | |
| 6,552,911 B1 | 4/2003 | Mayer et al. | |
| 2002/0166847 A1* | 11/2002 | Lacchetti et al. | ....... 219/121.64 |

FOREIGN PATENT DOCUMENTS

JP     2002-209345 A  *  7/2002

* cited by examiner

Primary Examiner—Minh Trinh
(74) Attorney, Agent, or Firm—William W. Haefliger

(57) ABSTRACT

The method of providing a motor, includes providing a first thin-walled end cap having first inner and outer walls connected by a first integral side wall, the first outer wall defining a first terminal edge; providing a second thin-walled end cap having second inner and outer walls connected by a second integral side wall, the second outer wall defining a second terminal edge; providing a stator, having multiple parallel laminations defining an axially extending bore to receive a laminated rotor, the stator having end laminations, positioning the end caps so that the edges extend adjacent stator opposite end laminations.

11 Claims, 6 Drawing Sheets

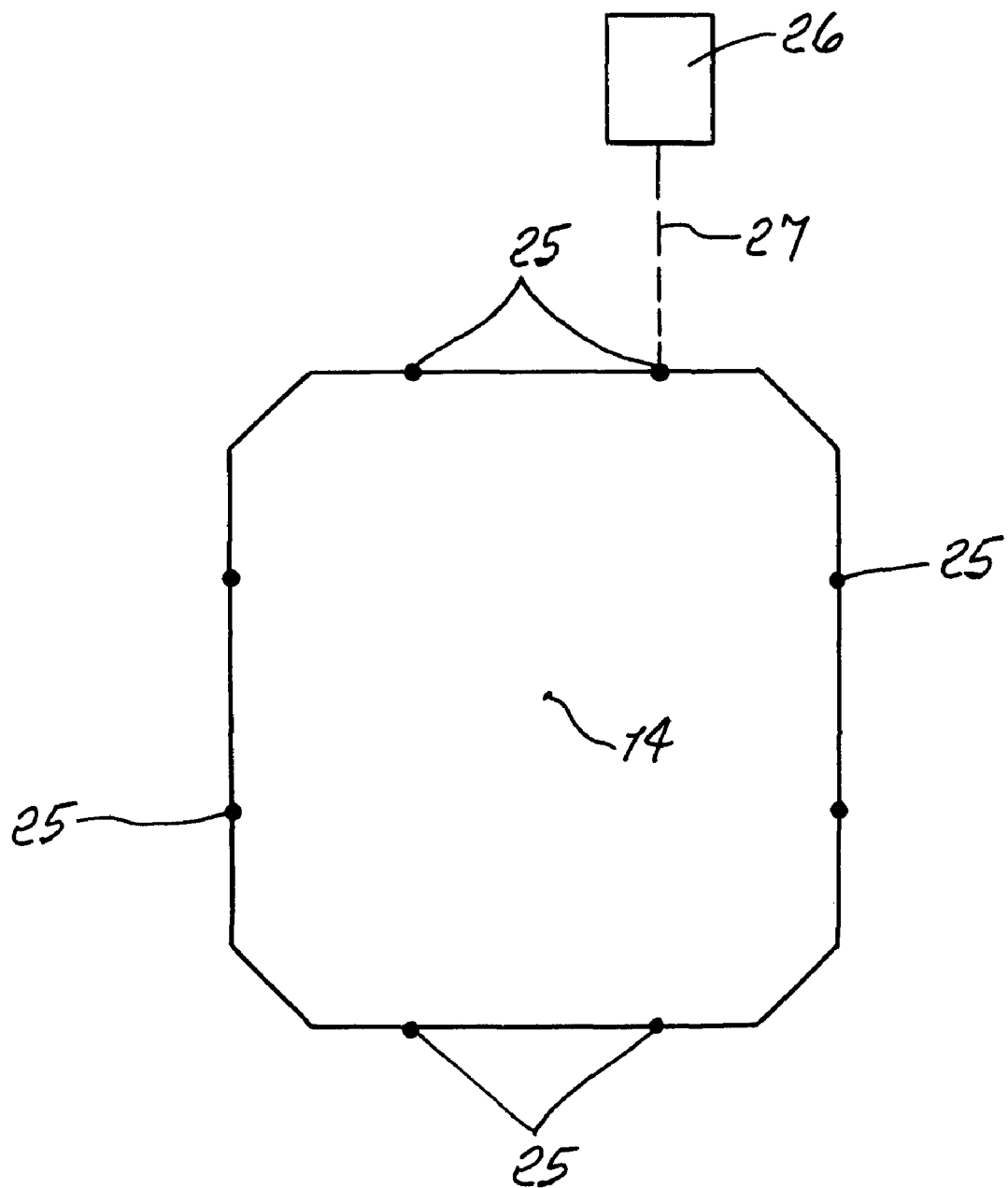

LASER WELDED STEP MOTOR CONSTRUCTION WITH COMPACT END CAP AND STATOR LAMINATION POSITIONING

BACKGROUND OF THE INVENTION

This invention relates generally to improvements in step motors, and more particularly to unusually advantageous positioning and retention of motor elements and assembly of such elements to achieve higher efficiency, lower cost and substantially better performance including higher torque output.

There is continual need for improvements as referred to, as in the construction, operation and results derived from same. In particular, there is need for multiple enhancements in motor element assembly, interfits and connections to achieve surprisingly significant overall improvements in performance, operation and compact construction, as will be seen herein.

SUMMARY OF THE INVENTION

It is a major object of the invention to provide a method of constructing and assembling a step motor that includes the steps:

a) providing a first thin-walled end cap having first inner and outer walls connected by a first integral side wall, the first outer wall defining a first terminal edge, b) providing a second thin-walled end cap having second inner and outer walls connected by a second integral side wall, the second outer wall defining a second terminal edge, c) providing a stator, having multiple parallel laminations defining an axially extending bore to receive a laminated rotor on a rotatable shaft, the stator having axially spaced end laminations, d) positioning the first and second end caps at opposite ends of the stator so that said first edge extends adjacent one of the stator end laminations and the second edge extends adjacent another of the stator end laminations, at the opposite end of the stator, e) and locally laser welding said edges to said stator end laminations, only at spaced locations about said axis and at the peripheries of said end laminations.

Another object is to provide for end cap peripheral mounting to stator end laminations, as by local and spacer laser welding of cap edges to end lamination while aligned in a fixture. In this regard, said end caps are typically formed and positioned to have said outer wall terminal edges brought into abutting relation to flat end faces of stator end flanges for accurate local laser welding thereto. Laser welding may then be accurately effected at spaced locations along said edges.

A further object is to provide said end caps to have differential inner diameters brought into abutting relation to flat end faces of stator laminations for accurate inner wall flexing during bearing assembly.

An additional object is to provide insert structure at one or both thin walled end caps proximate cap inner or outer enabling motor mounting to external structure.

An added object is to avoid the need for precision tolerances at the end caps. The concentricity of the inside diameters of end caps and stator is very difficult to be maintained consistently with any conventional design. The laser welding step as provided for herein eliminates the traditional tolerance stack-up problem and provides a consistent quality assembly, in production.

These and other objects and advantages of the invention, as well as the details of an illustrative embodiment, will be more fully understood from the following specification and drawings, in which:

DRAWING DESCRIPTION

FIG. 8 is a schematic showing representative laser weld positions, spaced about the assembly axis.

DETAILED DESCRIPTION

Figure 1:
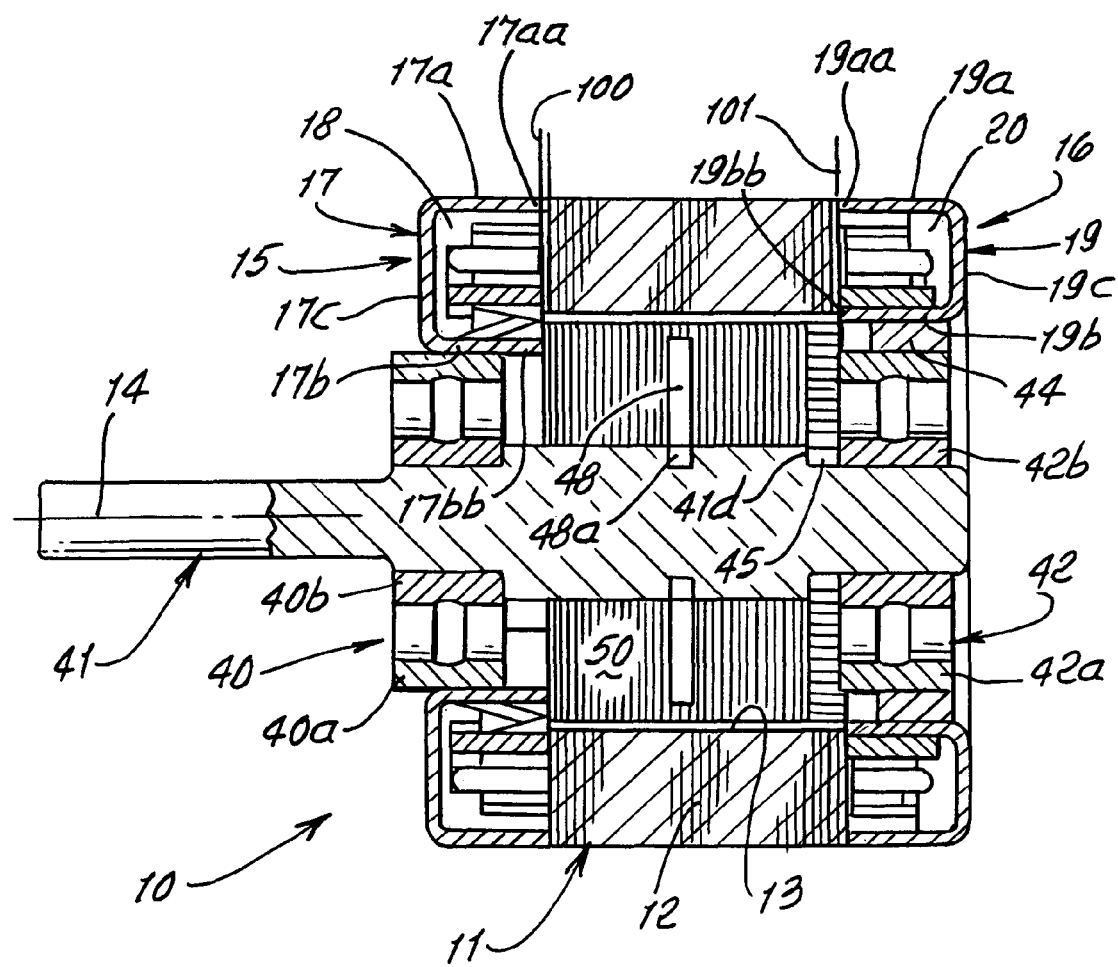
FIG. 1 is a section taken through a step motor showing end cap positioning a laser welded connection to a stator unit.

Referring first to FIG. 1, it shows an assembly 10 including an annular stator 11 that comprise multiple metallic laminations 12 defining a bore 13 and extending about motor axis 14. Two end cap sub-assemblies 15 and 16 are provided at opposite ends of the stator unit. Assembly 15 includes hollow metallic end cap 17 having inner and outer substantially annular thin walls 17a and 17b, and integral thin end wall 17c, together defining an interior substantially annular channel 18 opening rightwardly toward the left end of the stator. Assembly 16 includes hollow metallic end cap 19 having inner and outer substantially annular thin walls 19a and 19b, and integral thin end wall 19c, together defining an interior substantially annular channel 20 opening leftwardly toward the right end of the stator. All such walls of the end cap are sufficiently thin as to enable stamp production or formation of the end caps. For example, each of the three walls of the end cap 17 is of thickness $t_1$, less than 20% of the radius of channel 18; and likewise, each of the three walls of the end cap 19 is of thickness $t_2$, less than 20% of the radius of the channel 20.

Figure 2:
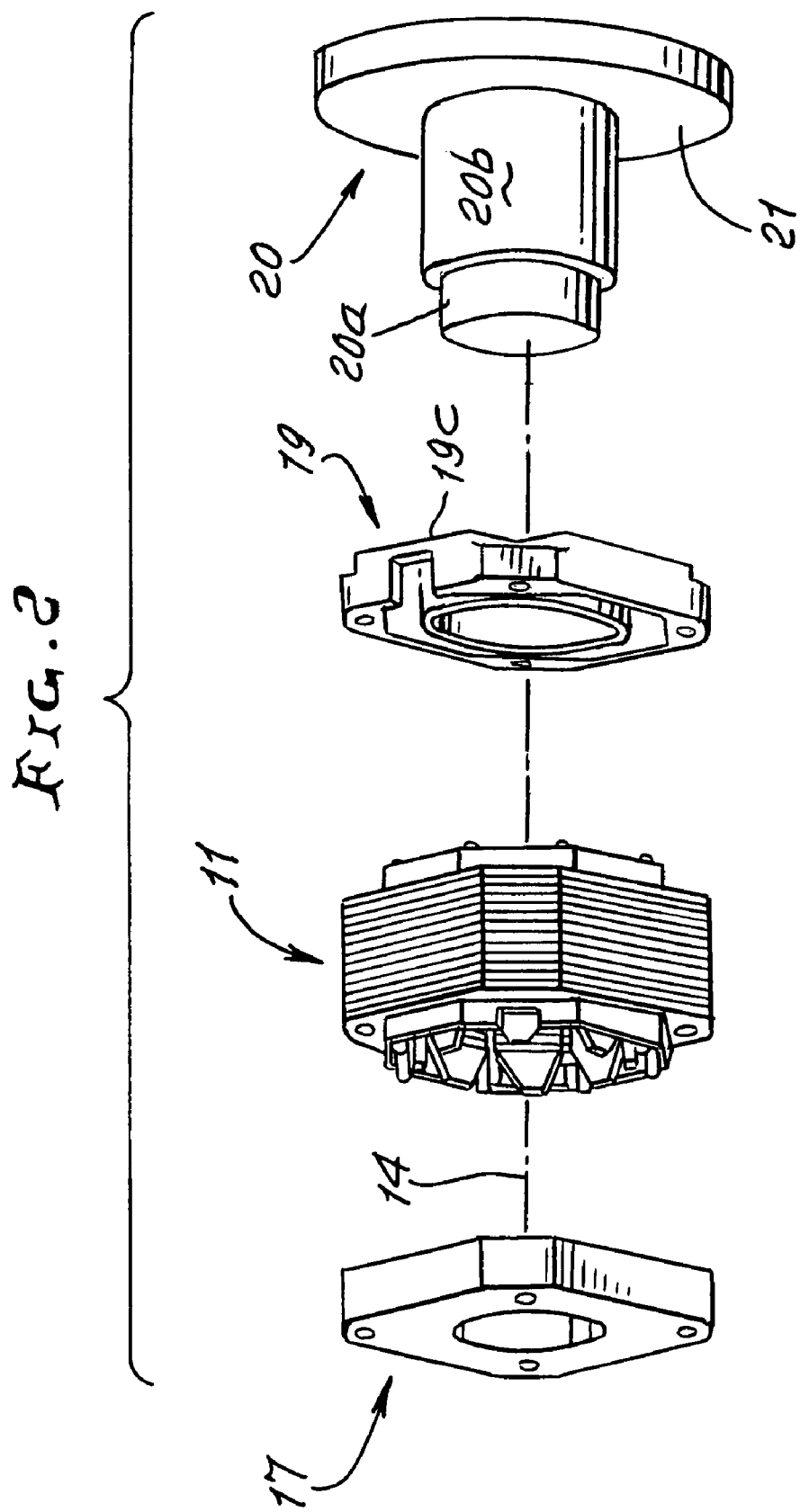
FIG. 2 is an exploded view showing end caps spaced axially endwise from a stator unit, and an alignment fixture.
Figure 3:
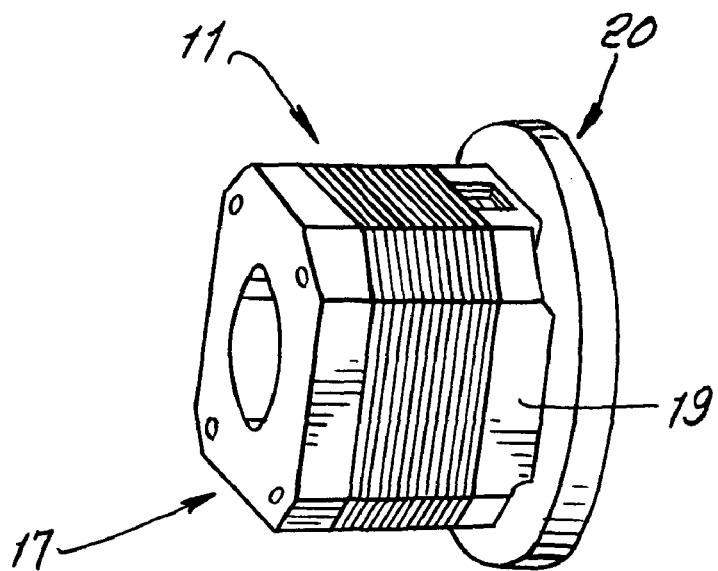
FIG. 3 is a view showing the FIG. 2 elements closed together for welding.
Figure 4:
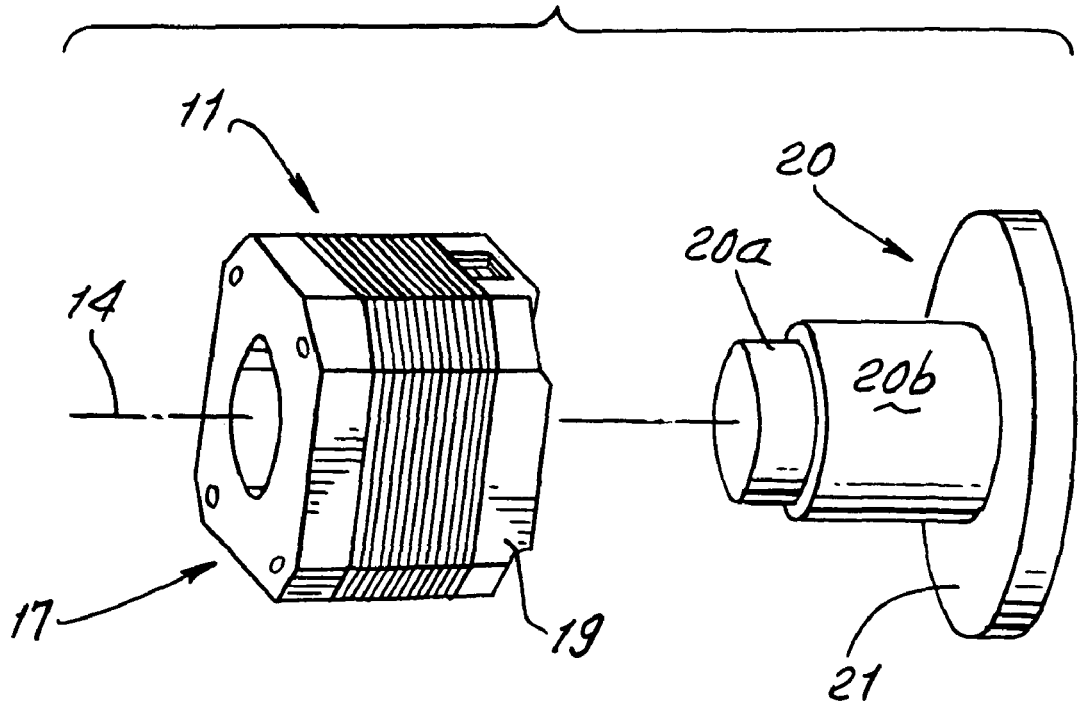
FIG. 4 is a view like FIG. 3 showing the alignment fixture withdrawn from the welded together elements.

During assembly, as shown in FIG. 2, the end caps 17 and 19, are respectively positioned on the stepped annular surfaces 20a and 20b of the fixture 20, and positioned endwise by fixture flange 21 engaging the end wall 19c of cap 19, so that the edge 17aa of outer wall 17a engages the left end of the stator, and so that the edge 19aa of outer wall 19a engages the rightward end of the stator, at the outer diameters of the stator ends. This enables laser welding of the cap outer walls to the left and right end stator laminations, at their peripheries and at multiple spaced locations about the assembly axis, whereby heat deformation of the caps and stator is avoided. FIG. 8 shows representative laser weld locations 25, as for example at eight spot-like weld locations, spaced about the axis 14. A laser beam generator 26 and beam 27 are also shown, whereby the assembly can be rotated about axis 14 and to enable successive welding at each such location.

Accordingly, the steps of the method can be defined as follows:

a) providing a first thin-walled end cap having first inner and outer walls connected by a first integral side wall, the first outer wall defining a first terminal edge, b) providing a second thin-walled end cap having second inner and outer walls connected by a second integral side wall, the second outer wall defining a second terminal edge, c) providing a stator, having multiple parallel laminations defining an axially extending bore to receive a laminated rotor on a rotatable shaft, said stator having axially spaced end laminations, d) positioning the first and second end caps at opposite ends of the stator so that said first edge extends adjacent one of the stator end laminations and the second edge extends adjacent another of said stator end laminations at the opposite end of the stator, e) and locally laser welding said edges to edges of said stator end laminations, only at spaced locations about said axis and at the peripheries of said end laminations.

The thin inner annular flange or wall 17b terminates rightwardly at annular edge 17bb, which serves the additional function of flexing slightly radially outwardly with wall interference fit to outer race 40a of bearing 40, displaced rightwardly relative to shaft 41 and into the position shown in FIG. 1, the inner bearing race 40b fitting onto outer annular shaft surface 41a, until 40b endwise engages shaft shoulder 41b. Such flexing of 17b is optimized by the local laser welding at the outer thin wall edge, as referred to, forces being transmitted from 17b to 17a and un-welded locations at 17aa. Likewise, the inner annular flange or wall 19b terminates leftwardly at annular edge 19bb which serves the added function of flexing slightly radially outwardly, with interference fit, as adapter sleeve 44 is displaced leftwardly relative to shaft 41, between outer race 42a of the bearing 42 and the wall 19b, into the position shown in FIG. 1. The inner bearing race 42b fits onto outer annular shaft surface 41c, until 42b endwise engages an annular insert 45, which engages shaft shoulder 41d.

Assembly of the bearings, as described, is facilitated by the endwise assembly of the shaft 41 into the position shown in FIG. 1, with laminated rotor 50, on the shaft, positioned radially inwardly of the stator. Note cap flange or wall 19b has an inner diameter greater than that of cap flange or wall 17b, to allow passage or assembly of the rotor endwise into the position shown. Cap inner flange edge 17bb can flex annularly outwardly since it is located adjacent the radial plane 100 defined by the left end wall of the rotor laminations, and cap inner flange edge 19bb can flex annularly outwardly since it is positioned adjacent the radial plane 101 defined by the rightward wall of the laminations. Such flexing is optimized by the local laser welding at the outer thin wall edge, as referred to. A magnet element 48 is carried by the rotor at 48a, and extends between rotor lamination at half the rotor laminations overall length, as shown, to optimally induce magnetic flux generation.

Accurate positioning of the rotor and rotor laminations relative to the stator laminations is thereby achieved by the bearings or bearing units retained by the end caps, which are laser welded to the stator end laminations. Note that the inner diameter $d_1$ of the end cap 19, as defined by the thin inner annular wall 19b, is approximately equal to the outer diameters of the laminations of the rotor, permitting rapid and accurate compact assembly; and shaft and rotor unit positioning relative to the stator is defined by bearing endwise positioning relative to the engaged thin inner walls of the caps laser welded to the stator.

Figure 5:
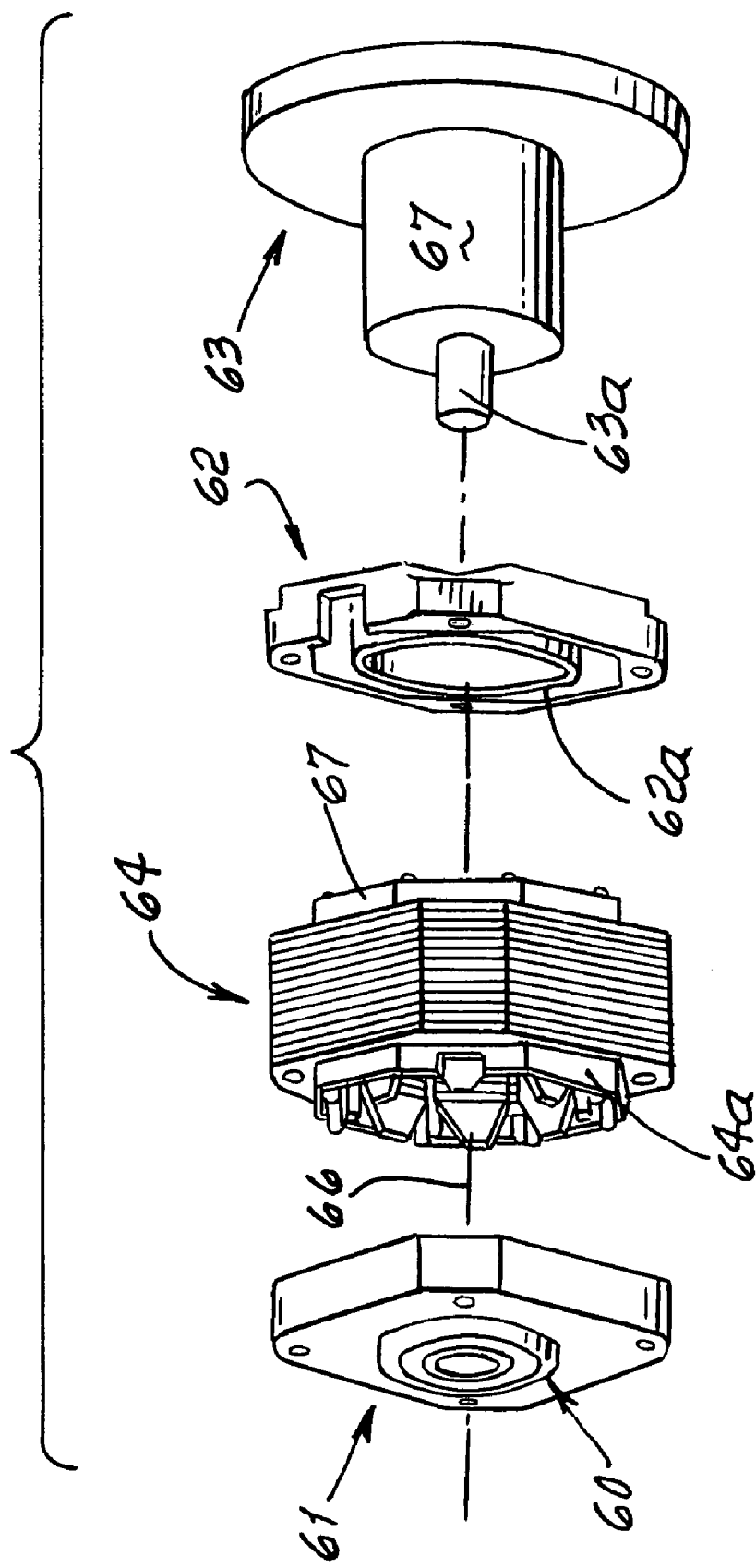
FIG. 5 is a view like FIG. 2, showing a modification.
Figure 6:
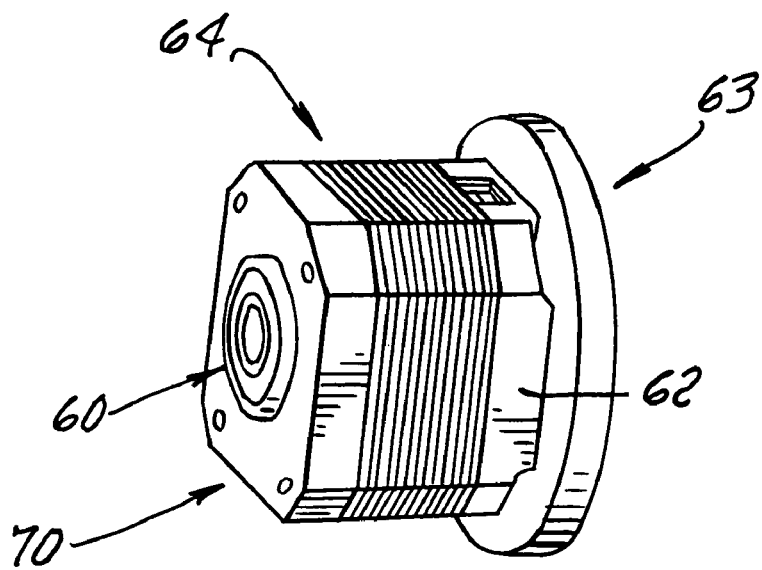
FIG. 6 is a view like FIG. 3 showing the FIG. 5 elements closed together, for welding.
Figure 7:
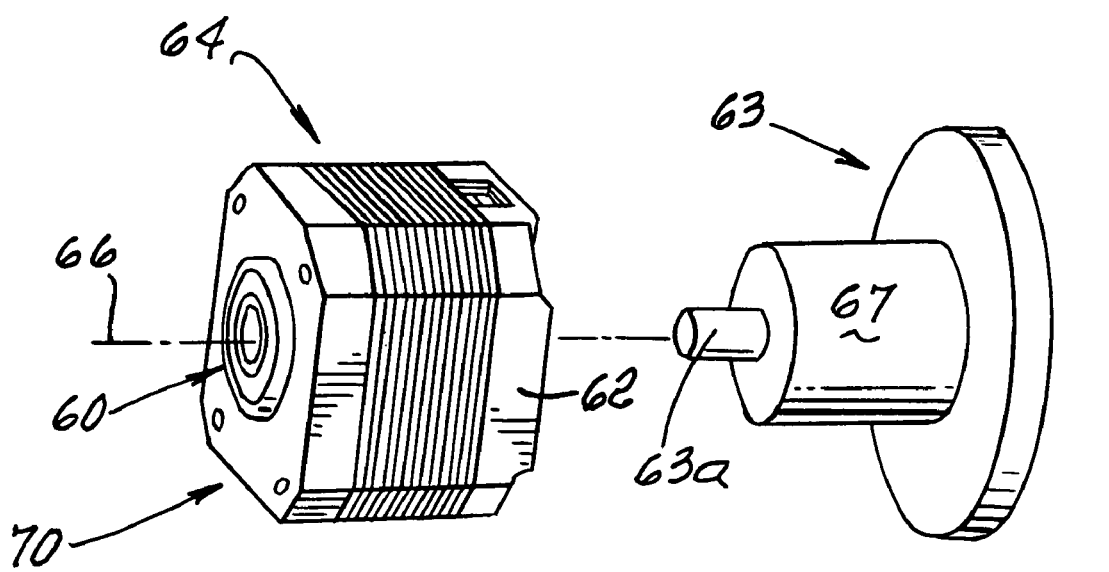
FIG. 7 is a view like FIG. 4, showing the alignment fixture withdrawn from the FIG. 6 welded together elements.

FIGS. 5-7 show a similar modification wherein the first bearing 60 is pre-assembled to the first end cap 61, prior to assembly of 61 and of the second end cap 62 onto fixture 63, enabling local laser welding as described in connection with FIG. 8. The fixture has a cylindrical surface 63a that fits into the inner race of the bearing 60; thereby centering first end cap 61 relative to the stator 64. A stator flange or flanges 64a project endwise leftwardly into end cap 61 to assist in centering of the flange and end cap, relative to axis 66. A second stator flange or flanges 67 project endwise rightwardly into the second end cap to assist centering relative to axis 66, the fixture 67 having a cylindrical surface that engages the bore defined by the thin inner wall 62a of second cap 62, for centering, and prior to shaft assembly into the structure of motor 70.

It will be further noted, in FIG. 1, that the edge 17bb of the end cap inner wall 17b extends proximate the lower left corner of the stator and the upper left corner of the rotor laminations as well as proximate the upper right corner of the bearing outer race 40a, to provide highly compact motor structure, enabling use of a relatively large bearing 40. Likewise, the edge 19bb of end cap inner wall 19b extends proximate the lower right corner of the stator 11, and the upper right corner of the rotor laminations, as well as proximate the upper left corner of the hearing outer race 42a, to provide highly compact structure.

Structure within the cap channels 18 and 20 includes wire windings and other motor circuitry.

I claim:

1. A method for making motor assembly, comprising steps of:

a) providing a first thin-walled end cap having first inner and outer walls connected by a first integral side wall, the first outer wall defining a first terminal edge, b) providing a second thin-walled end cap having second inner and outer walls connected by a second integral side wall, the second outer wall defining a second terminal edge, c) providing a stator, having multiple parallel laminations defining an axially extending bore to receive a laminated rotor on a rotatable shaft, said stator having axially spaced end laminations, d) positioning said first and second end caps at opposite ends of the stator so that said first edge extends adjacent one of the stator end laminations and the second edge extends adjacent another of said stator end laminations at the opposite end of the stator, e) and locally laser welding said edges to said stator end laminations, only at spaced locations about said axis and at the peripheries of said end laminations.

2. The method of claim 1 including providing a first bearing unit having annular inner and outer races, and axially installing said outer race in interference engagement with the inner thin wall of one of said first end caps, and to flex said inner wall proximate said terminal edge thereof projecting away from said first cap side wall, thereby providing first cap positive frictional retention to the first bearing unit.

3. The method of claim 2 including providing a second bearing unit having inner and outer races, and installing said outer race in radially spaced relation to the inner thin wall of said second end cap, and providing and installing a spacer sleeve between and in interference engagement with said second bearing outer race and with said second cap inner thin wall, to flex said inner thin wall proximate said terminal edge thereof projecting away from said second cap side wall, thereby providing second cap positive frictional retention to the second bearing unit.

4. The method of claim 2 wherein the first end cap inner wall has an edge, and including locating said edge proximate a corner of the stator and proximate a corner of rotor laminations, and also proximate a corner of the first bearing outer race.

5. The method of claim 1 wherein said end cap terminal edges are peripherally laser welded to stator end laminations in parallel planes at opposite ends of the stator.

6. The method of claim 5 wherein said end caps are formed and positioned to have said terminal edges brought into abutting relation to flat end faces of stator end laminations for accurate laser welding thereto.

7. The method of claim 6 including effecting said laser welding only at spaced apart locations about said axis and at local positions along said edges.

8. The method of claim 1 including mounting an insert or inserts on an end wall defined by one of the end caps.

9. The method of claim 1 wherein said end caps are provided to have differential inner wall diameters, and said bearing units have the same outer diameters, said end cap inner wall terminal edges flexed toward said outer wall terminal edges.

10. The method of claim 1 including providing and positioning a magnet element between rotor laminations, about halfway along the rotor laminations overall length, to include magnetic flux generation.

11. The method of claim 1 including pre-assembling the first bearing to the first end cap, and subsequently effecting laser welding of the first end cap to stator end lamination or laminations, at spaced locations about said axis.

* * * * *